(12) United States Patent
Lin

(10) Patent No.: US 7,572,119 B2
(45) Date of Patent: Aug. 11, 2009

(54) AIR CYLINDER FOR PNEUMATIC TOOL

(75) Inventor: Freddy Lin, Taichung Hsien (TW)

(73) Assignee: Gison Machinery Co., Ltd., Taichung Hsien (TW)

( * ) Notice: Subject to any disclaimer, the term of this patent is extended or adjusted under 35 U.S.C. 154(b) by 210 days.

(21) Appl. No.: 11/580,297

(22) Filed: Oct. 13, 2006

(65) Prior Publication Data

US 2008/0087451 A1    Apr. 17, 2008

(51) Int. Cl.
  *F01C 21/00*  (2006.01)
  *F03C 2/00*   (2006.01)
  *F04C 15/00*  (2006.01)
(52) U.S. Cl. .................. 418/270; 418/15; 418/133
(58) Field of Classification Search ............. 418/15, 418/86, 131–135, 207, 70, 270, DIG. 1; 415/904; 173/218
  See application file for complete search history.

(56) References Cited

U.S. PATENT DOCUMENTS

| | | | | |
|---|---|---|---|---|
| 3,901,631 A | * | 8/1975 | Wickham et al. | 418/270 |
| 5,087,180 A | * | 2/1992 | Clapp | 418/133 |
| 5,383,771 A | * | 1/1995 | Ghode et al. | 418/15 |
| 6,241,500 B1 | * | 6/2001 | Ellis | 418/270 |
| 7,029,253 B2 | * | 4/2006 | Lin | 418/270 |

* cited by examiner

*Primary Examiner*—Theresa Trieu
(74) *Attorney, Agent, or Firm*—Troxell Law Office PLLC

(57) ABSTRACT

An air cylinder for pneumatic tool includes a cylinder body, and front and rear cylinder caps covered onto two ends of the cylinder body. The cylinder body defines a cylinder chamber for mounting a rotor therein, and has an air passage with two open ends of the passage respectively located at two ends of the cylinder body. The rear cylinder cap is provided with an air inlet that is aligned with the air passage and has an inner end communicable with the cylinder chamber. A guide opening is formed on an inner end surface of the front cylinder cap to communicate the air passage with the cylinder chamber. At least one of the two cylinder caps is provided with a plurality of exhaust holes communicating with the cylinder chamber for discharging exhaust air.

12 Claims, 9 Drawing Sheets

AIR CYLINDER FOR PNEUMATIC TOOL

FIELD OF THE INVENTION

The present invention relates to pneumatic tools, and more particularly to an air cylinder for pneumatic tool. The air cylinder has a cylinder body that can be easily machined to have a smooth inner wall surface, so as to reduce wearing and accordingly extend the service life of vanes in the air cylinder.

BACKGROUND OF THE INVENTION

Air cylinders for pneumatic tool have a cylinder chamber, in which a rotor is mounted. The rotor has a plurality of vanes mounted on a circumferential surface thereof, such that outer edges of the vanes are in close contact with an inner wall surface of the cylinder chamber. High-pressure air is guided into the cylinder chamber via an air inlet on the air cylinder to drive the rotor to rotate, and then discharged as exhaust air via an exhaust hole on the air cylinder.

FIGS. 1 and 2 show two conventional cylinder bodies 10, 20 for air cylinders. As shown, air inlets 12, 22 and exhaust holes 14, 24 all are provided on the cylinder bodies 10, 20 to communicate with the cylinder chamber 16, 26. To form the air inlet and the exhaust hole on a circumferential wall of the cylinder body, the cylinder body must be machined several times in a non-continuous manner. That is, the cylinder bodies 10, 20 must be turned to form the cylinder chambers 16, 26, and then machined to form the air inlets 12, 22 and the exhaust holes 14, 24.

Since the forming of the cylinder chamber, the air inlet, and the exhaust hole on the cylinder body necessitates different and non-continuous processing steps, it is uneasy to produce the cylinder body and the manufacturing cost thereof is high.

Moreover, the different non-continuous processing steps for forming the cylinder body produce height differences on inner wall surface of the cylinder chamber 16, 26, resulting in a stepped, unsmooth, and burr-containing inner wall surface of the cylinder chamber. When the rotor rotates, the vanes thereof tend to be quickly worn off at outer edges by the unsmooth surface of the cylinder chamber, and therefore have a shortened service life and require frequent replacement.

SUMMARY OF THE INVENTION

A primary object of the present invention is to provide an air cylinder having a cylinder body that can be easily machined.

Another object of the present invention is to provide an air cylinder that protects vanes on a vane rotor in the air cylinder from being easily worn off.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
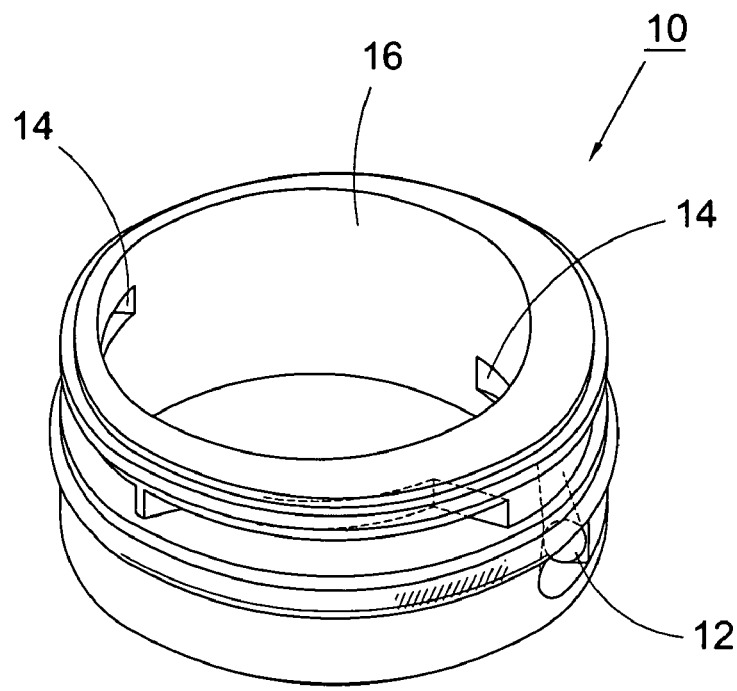
FIG. 1 is a perspective view of a conventional cylinder body for air cylinder.
Figure 2:
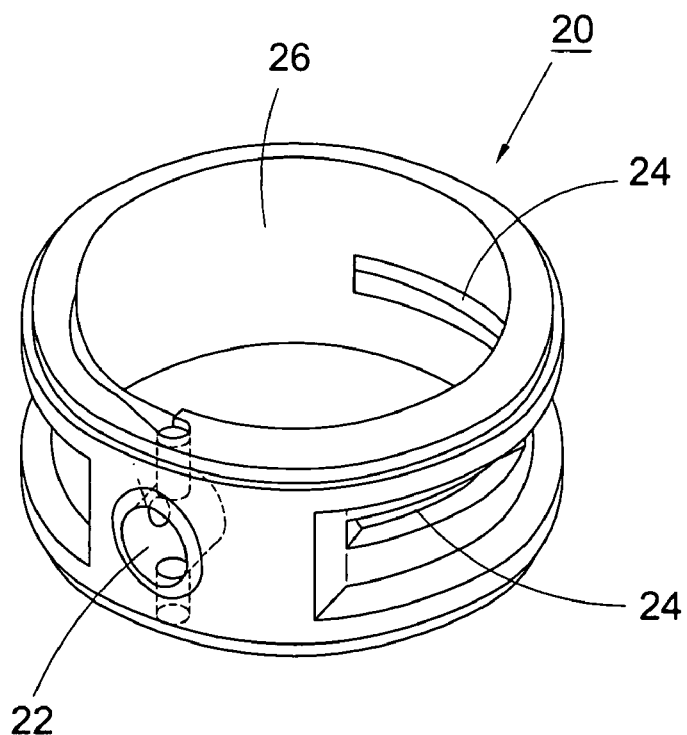
FIG. 2 is a perspective view of another conventional cylinder body for air cylinder.
Figure 3:
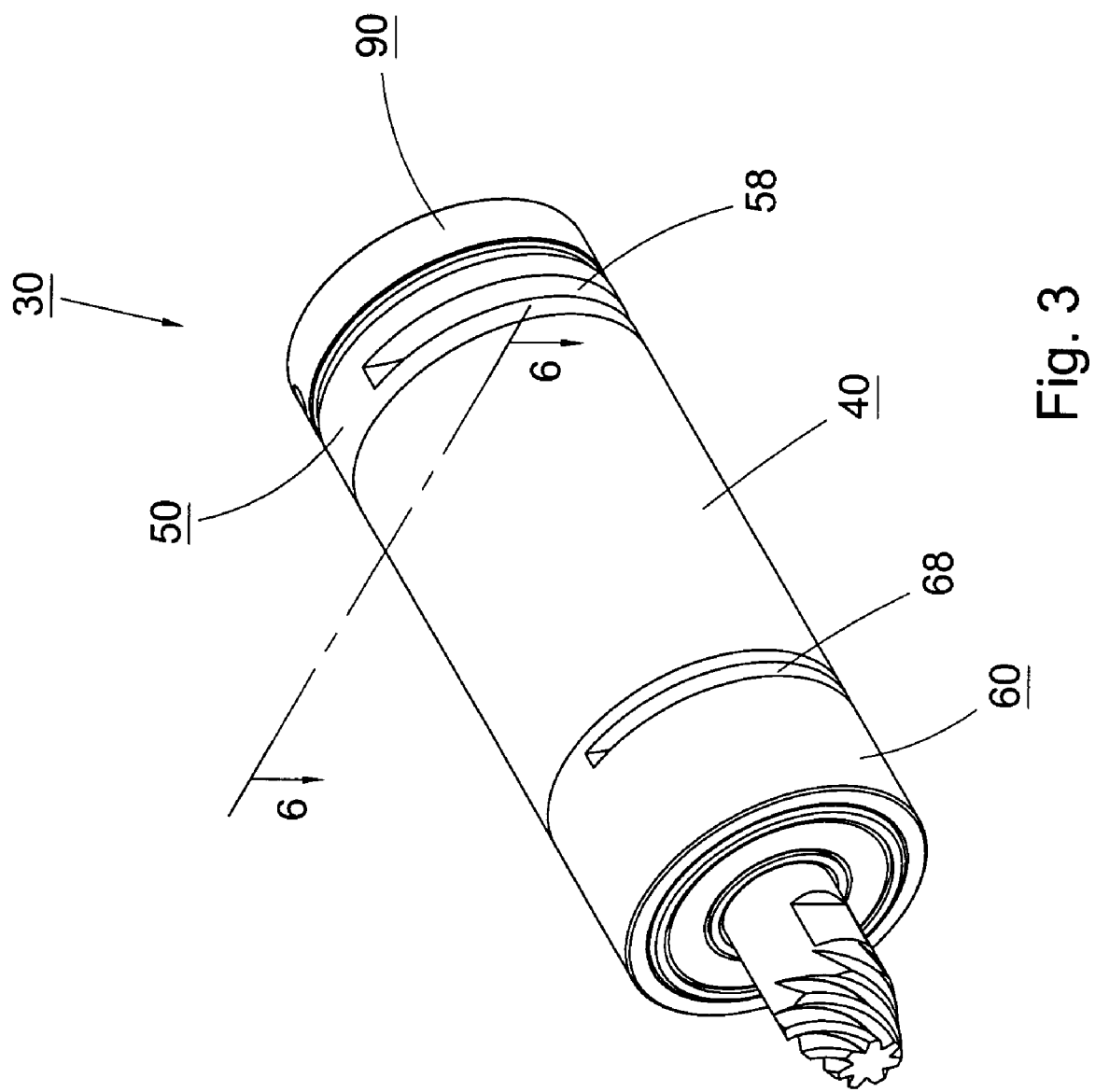
FIG. 3 is a perspective view of an air cylinder for pneumatic tool according to a preferred embodiment of the present invention.
Figure 4:
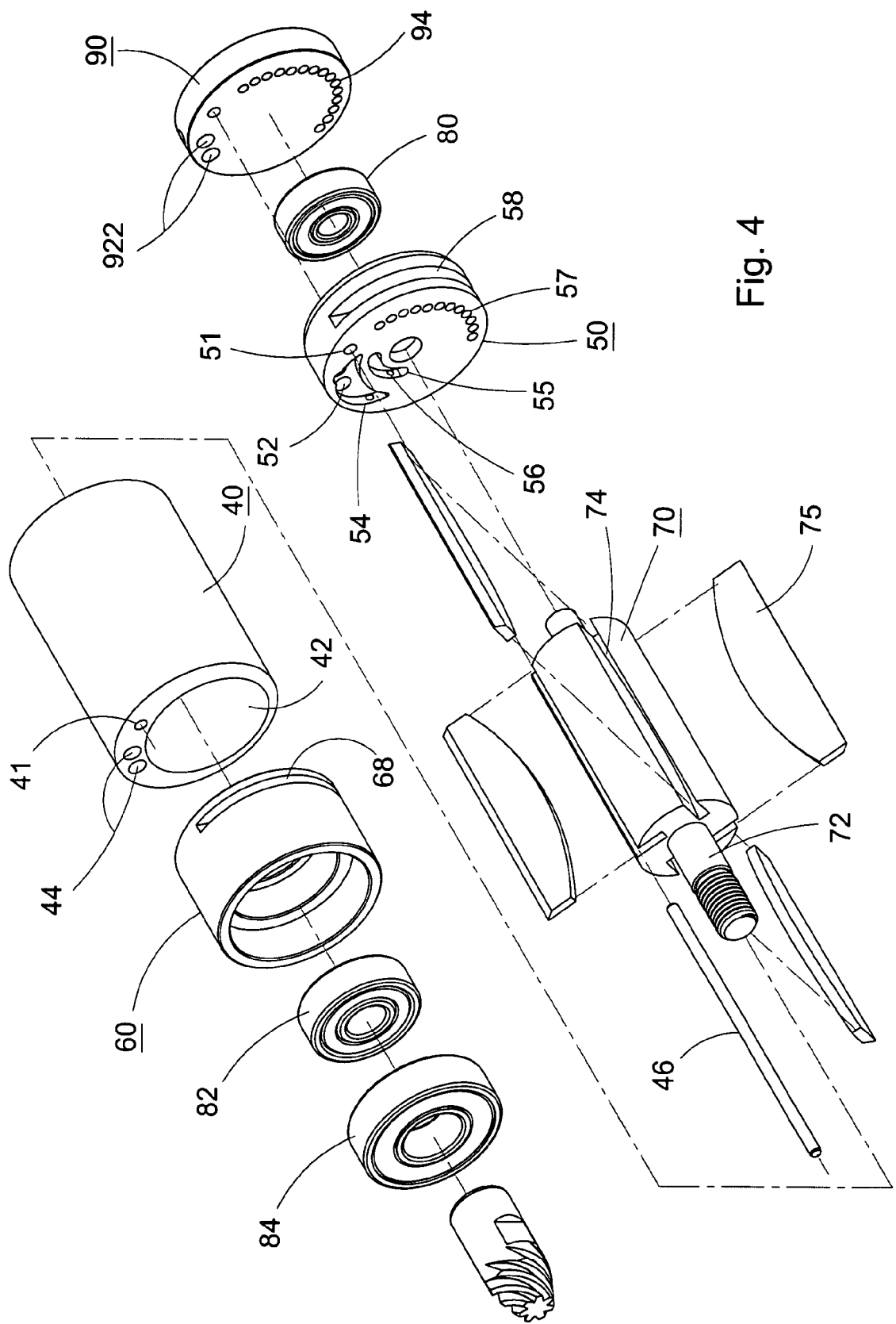
FIG. 4 is an exploded view of FIG. 3.

Please refer to FIGS. 3 and 4 that are assembled and exploded perspective views, respectively, of an air cylinder 30 according to a preferred embodiment of the present invention for use with a pneumatic tool. As shown, the air cylinder 30 mainly includes a cylinder body 40, a rear cylinder cap 50, and a front cylinder cap 60. A rotor 70 with vanes 75 is mounted in the air cylinder 30.

The cylinder body 40 has a cylinder chamber 42 therein with two open ends of the cylinder chamber 42 located at two ends of the cylinder body 40. An air passage 44 (consisting of one or more holes) is axially formed in the cylinder body 40 with two open ends of the air passage 44 located at two ends of the cylinder body 40.

The rear and front cylinder caps 50, 60 are respectively covered onto two ends of the cylinder body 40. Please refer to FIG. 7, a locating pin 46 extends into a pin hole 41 of the cylinder body 40 and pin holes 51, 61 of the two caps 50, 60 respectively, so that the cylinder body 40 and the two cylinder cap 50, 60 are held to the same angular position.

Figure 8:
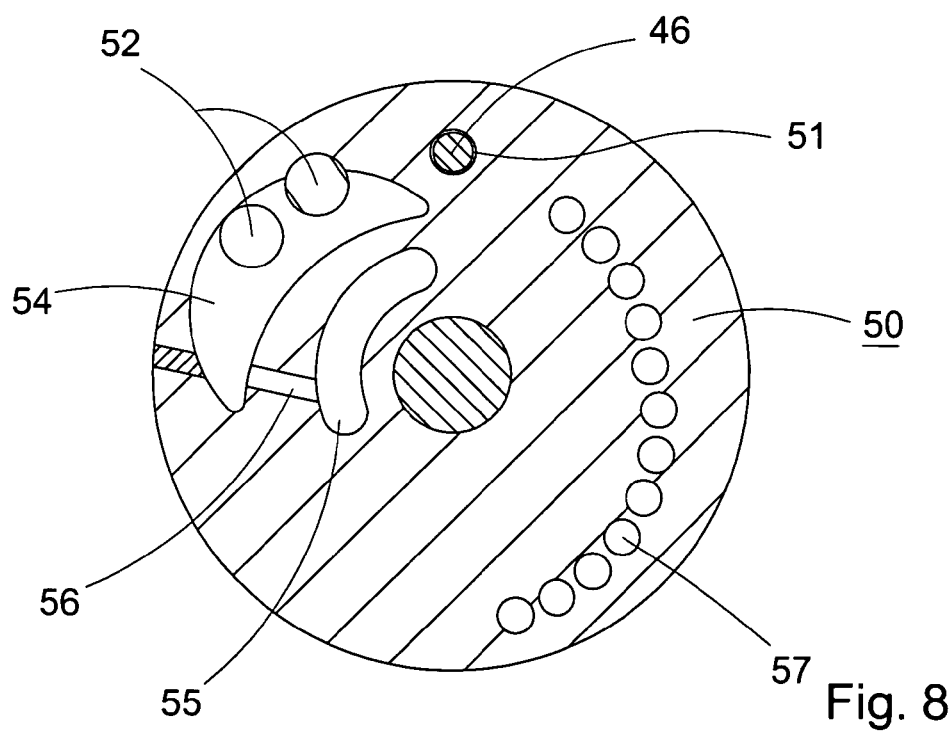
FIG. 8 is a sectional view taken along line 8-8 of FIG. 7.
Figure 9:
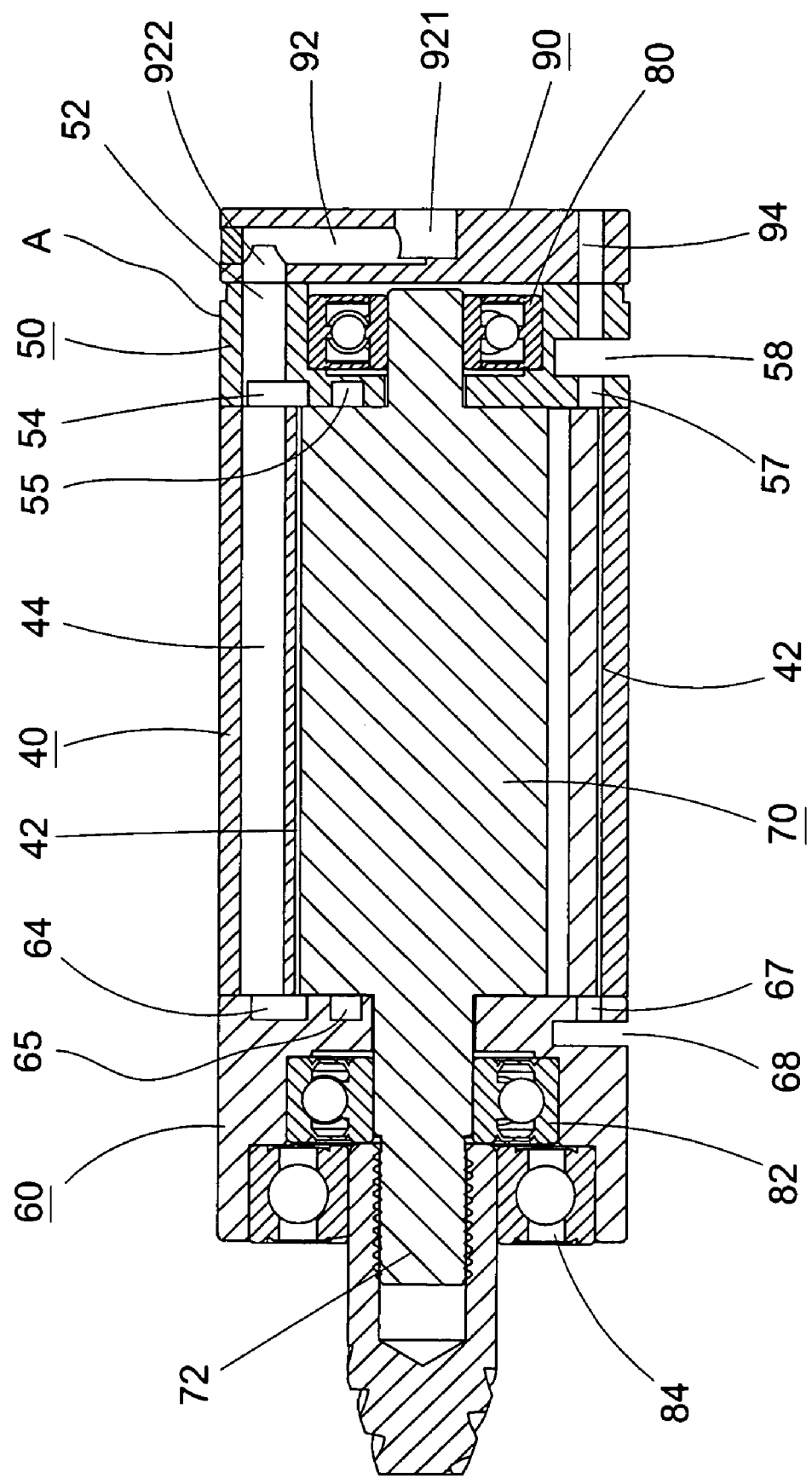
FIG. 9 is a sectional view taken along line 9-9 of FIG. 6.

The rear cylinder cap 50 is provided with an air inlet 52 (consisting of one or more holes) aligned with the air passage 44 of the cylinder body 40, as shown in FIG. 9. Meanwhile, rear cylinder cap 50 is provided on an inner end surface with a crescent guide opening 54 and an arcuate air slot 55. The guide opening 54 is located at an inner end of the air inlet 52. Please refer to FIG. 6, an inner side of the guide opening 54 overlaps with the cylinder chamber 42, so that the inner end of the air inlet 52 communicates with the cylinder chamber 42 via the guide opening. Refers to FIG. 8, a through hole 56 is provided to communicate the guide opening 54 with the air slot 55. The rear cylinder cap 50 is also provided with a plurality of exhaust holes 57, such that the exhaust holes 57 are located at some distance from the air inlet 52.

Figure 5:
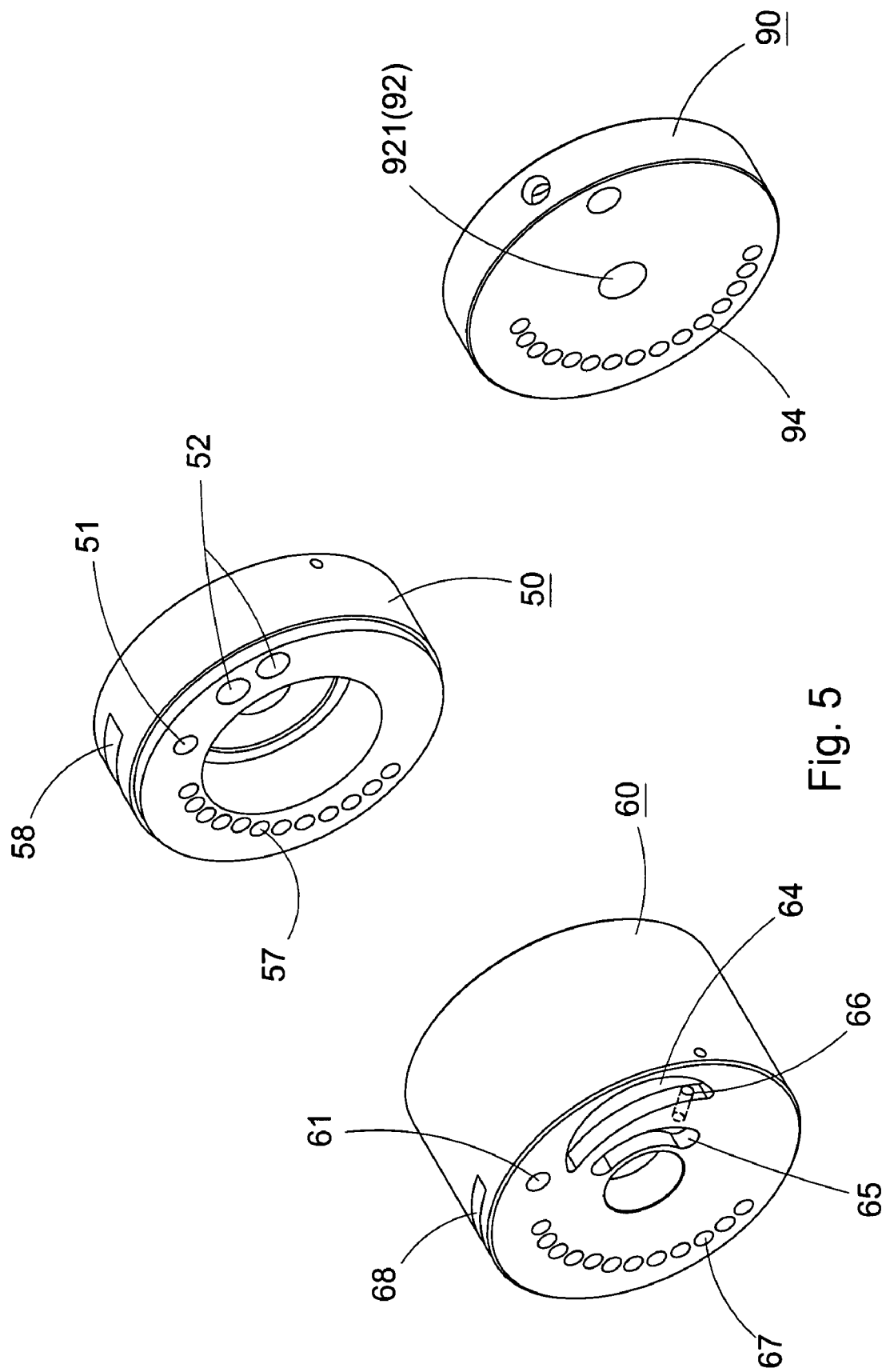
FIG. 5 shows the rear perspective views of a front and a rear cylinder cap and an air guiding member included in the air cylinder according to the preferred embodiment of the present invention.

Please refer to FIG. 5. The front cylinder cap 60 is also provided on an inner end surface with a crescent guide opening 64 and an arcuate air slot 65. The guide opening 64 communicates the air passage 44 with the cylinder chamber 42 of the cylinder body 40, as can be seen from FIG. 9. A through hole 66 communicates the guide opening 64 with the air slot 65. The front cylinder cap 60 is also provided with a plurality of exhaust holes 67, which are located at some distance from the guide opening 64.

Figure 10:
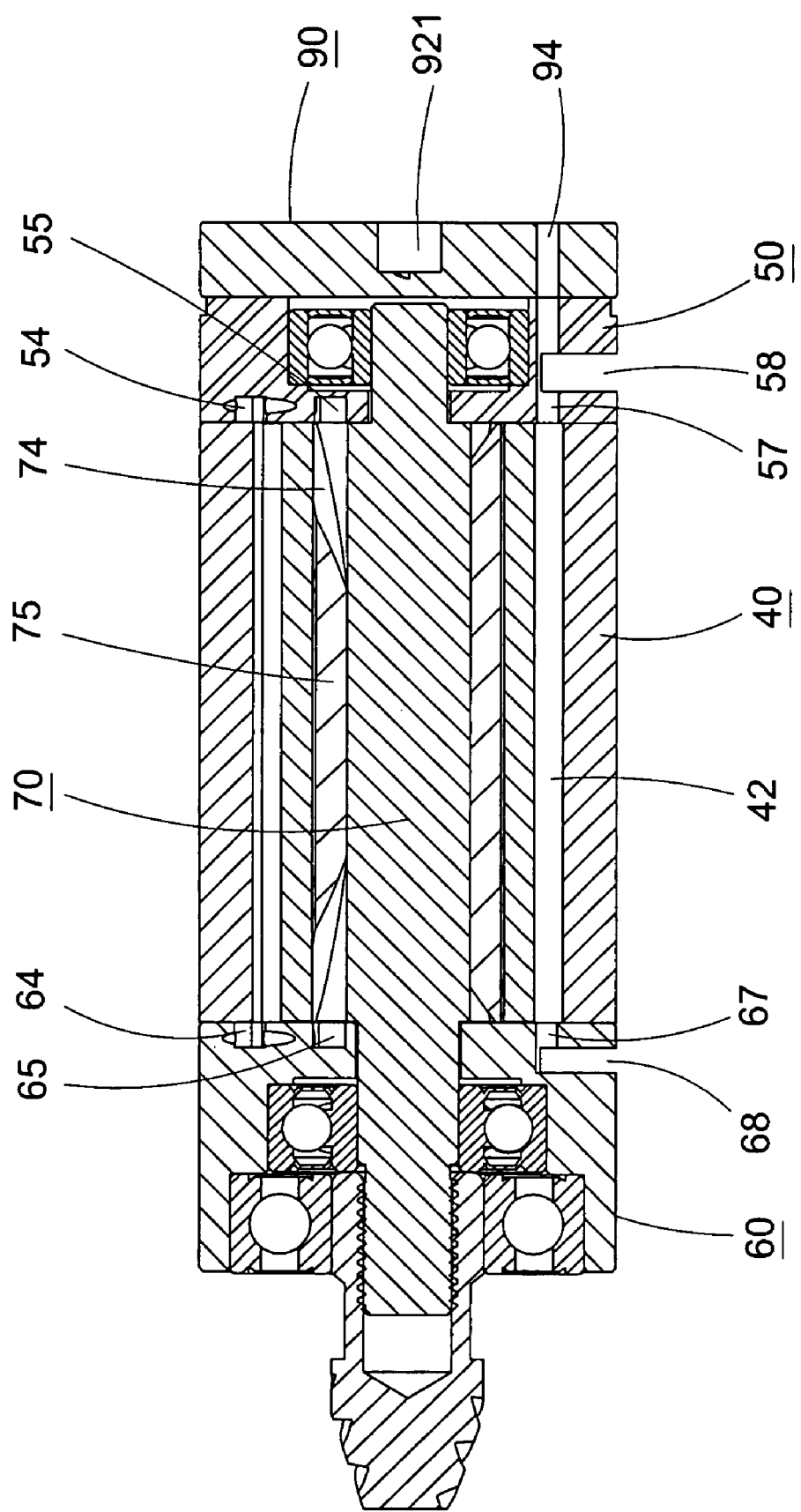
FIG. 10 is a sectional view taken along line 10-10 of FIG. 6.

The rear and the front cylinder cap 50, 60 are located at the same angular position, and accordingly, the guide openings 54, 64 on the rear and front cylinder caps 50, 60 are corresponding to each other in position. Similarly, the exhaust holes 57 are corresponding to the exhaust holes 67 in position. Please refer to FIGS. 6 and 9. The guide opening 54 on the rear cylinder cap 50 tangentially contacts with the cylinder chamber 42, and so does the guide opening 64. And the exhaust holes 57 communicate with the cylinder chamber 42, and so do the exhaust holes 67 (see FIG. 10).

Figure 7:
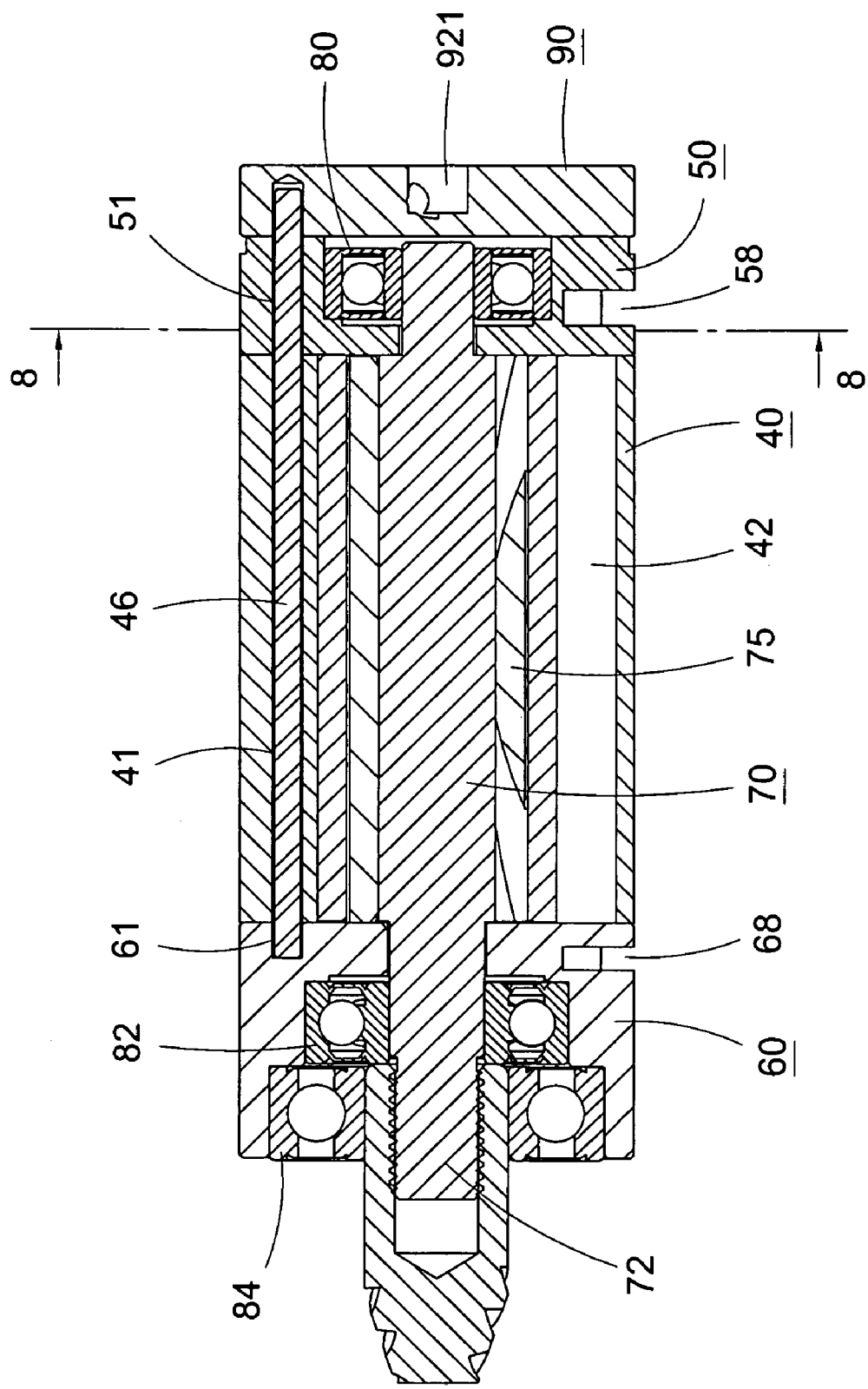
FIG. 7 is a sectional view taken along line 7-7 of FIG. 6.

Multiple bearings 80, 82 and 84 are respectively mounted in the rear and the front cylinder cap 50, 60, as shown in FIG. 7. Said rotor 70 is mounted in the cylinder chamber 42 with a rotational shaft 72 thereof extended at two ends into the rear and the front cylinder cap 50, 60 to be supported by the bearings.

Please refer to FIGS. 4, 5, and 9. The preferred embodiment further includes an air guiding member 90 mounted to an outer end of the rear cylinder cap 50. The air guiding member 90 is internally provided with a passage 92, which has an inlet 921 and an outlet 922 located at an outer end and an inner end surfaces, respectively, of the air guiding member 90. The outlet 922 is aligned with the air inlet 52 of the rear cylinder cap 50. A plurality of exhaust holes 94 are provided on the air guiding member 90 corresponding to the exhaust holes 57 of the rear cylinder cap 50, as can be seen from FIG. 10. The air guiding member 90 is provided for guiding high pressure air to the air inlet 52 of the rear cylinder cap 50 via the passage 92. In the event the air inlet 52 has an inlet port located on a circumferential wall of the rear cylinder cap 50, as indicated by the reference letter A in FIG. 9, instead of locating on an outer end surface of the rear cylinder cap 50, the air guiding member 90 may be omitted from the air cylinder 30 of the present invention.

Moreover, in the illustrated preferred embodiment, the rear and the front cylinder cap 50, 60 are provided on respective circumferential wall with an air releasing slot 58, 68 to communicate with the exhaust holes 57, 67, respectively. The air releasing slots 58, 68 are extensions of the exhaust holes 57, 67 to allow releasing of air from the circumferential walls of the two cylinder caps 50, 60.

Please refer to FIG. 9. When the air cylinder 30 is in use, high pressure air is guided into the passage 92 in the air guiding member 90 to flow through the air inlet 52 on the rear cylinder cap 50 into the air passage 44 on the cylinder body 40. Since the air passage 44 communicates the rear cylinder cap 50 with the front cylinder cap 60, the high pressure air may flow into the guide openings 54, 64 and the air slots 55, 65 on the rear and the front cylinder cap 50, 60.

Figure 6:
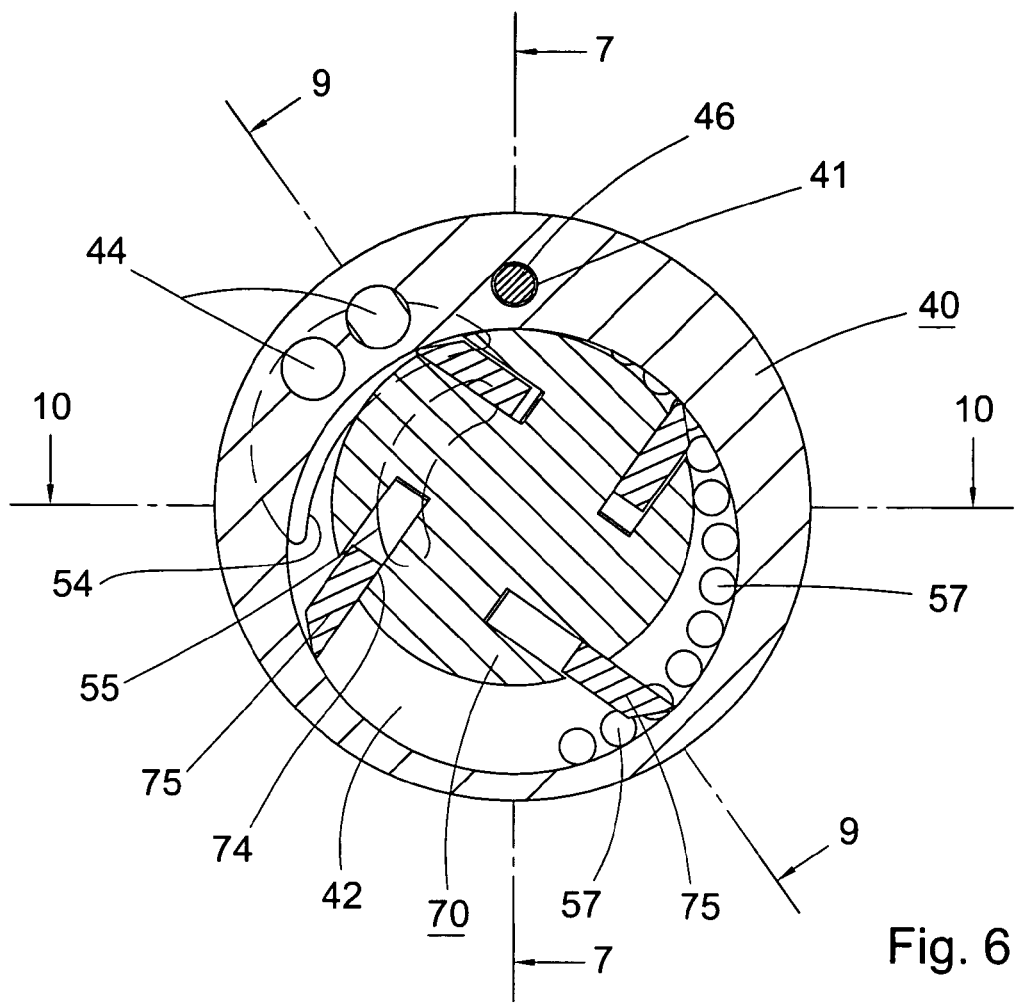
FIG. 6 is a sectional view taken along line 6-6 of FIG. 3.

As can be seen from FIG. 6, the air slots 55, 65 serve to guide the high pressure air into vane slots 74 of the rotor 70, so that the vanes 75 set in the vane slots 74 are outward pushed by the air to thereby bear an outer edge against an inner wall surface of the cylinder chamber 42. Alternatively, springs may be mounted in the vane slots 74 for pushing the vanes 75 outward. In this case, the air slots 55, 65 may be omitted from the cylinder caps 50, 60.

The high pressure air flows into the cylinder chamber 42 via the guide openings 54, 64 to drive the rotor 70 to rotate. When the air flows to the exhaust holes 57, 67 of the rear and the front cylinder cap 50, 60, the air is discharged as exhaust air from the air cylinder 30 via the exhaust holes 57, 67.

Figure 11:
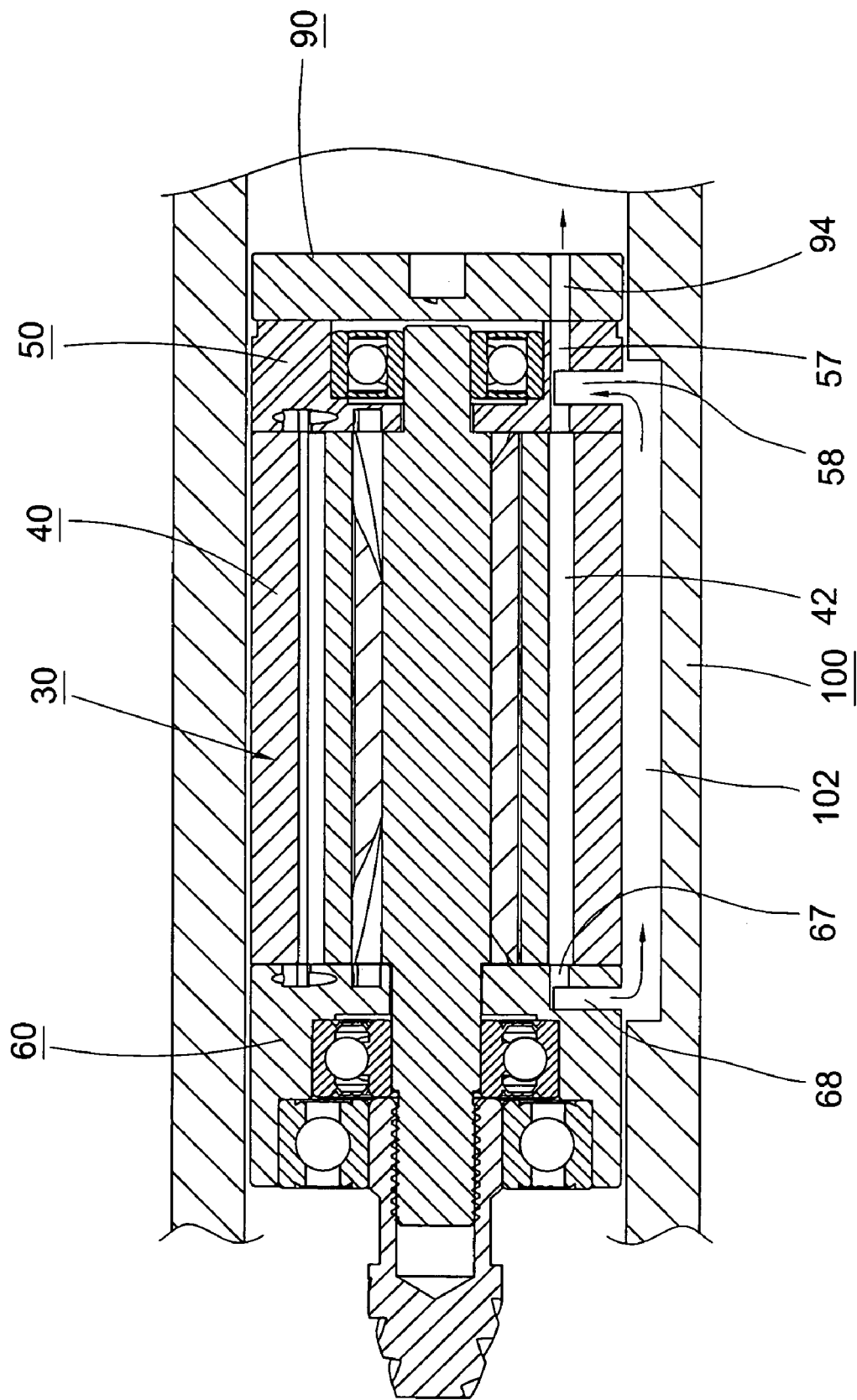
FIG. 11 shows the air cylinder of the present invention being mounted in a housing of a pneumatic tool.

In the event there are not exhaust holes 57 provided on the rear cylinder cap 50, exhaust air is discharged via the exhaust holes 67 on the front cylinder cap 60. Similarly, in the event there are not exhaust holes 67 provided on the front cylinder cap 60, exhaust air is discharged via the exhaust holes 57 of the rear cylinder cap. In addition, refers to FIG. 11, when the air cylinder 30 is mounted in a housing 100 of a pneumatic tool, a space 102 defined in the housing 100 is communicable with the exhaust holes 57 and 67 of the two cylinder cap 50, 60, so that exhaust air may be discharged from a rear end of the air cylinder 30.

The air cylinder according to the present invention provides the following advantages:

1. The cylinder body 40 is not provided with any air inlet or exhaust hole and therefore has an integral cylinder chamber that can be directly formed in only one processing step. Therefore, the cylinder body of the air cylinder of the present invention may be easily processed at reduced manufacturing cost.
2. Since the cylinder chamber 42 is processed in only one step, a stepped or burr-containing inner wall surface can therefore be avoided. In other words, the cylinder chamber 42 according to the present invention has smooth and step-free inner wall surface, so that the vanes 75 on the rotor 70 are not easily worn off and have extended service life.

The above embodiment is only used to illustrate the present invention, not intended to limit the scope thereof. Many modifications of the above embodiments can be made without departing from the spirit of the present invention.

What is claimed is:

1. An air cylinder, comprising:
   a cylinder body having a cylinder chamber therein for mounting a rotor, two open ends of the cylinder chamber being located at two end of said cylinder body; an air passage being formed in said cylinder body with two open ends of said air passage located at two ends of said cylinder body;
   a rear cylinder cap being covered onto a rear end of said cylinder body, and having an air inlet provided thereon to communicate with said air passage of said cylinder body, and an inner end of said air inlet also communicating with said cylinder chamber;
   a front cylinder cap being covered onto a front end of said cylinder body; a guide opening being formed on an inner end surface of said front cylinder cap, and communicating said air passage of said cylinder body with said cylinder chamber; and
   a plurality of exhaust holes being provided on at least one of said cylinder caps to communicate with said cylinder chamber,
   wherein said cylinder is configured to flow pressurized air entering said air passage through both said inner end of said air inlet and said guide opening into said cylinder chamber,
   wherein said rear cylinder cap is provided on an inner end surface with an air slot, such that said air slot is more closer to a center of said rear cylinder cap than said air inlet; a through hole being provided on said rear cylinder cap to communicate said air slot with said air inlet; and said front cylinder cap is provided on the inner end surface with an air slot, such that said air slot is more closer to a center of said front cylinder cap than said guide opening; and a through hole being provided on said front cylinder cap to communicate said air slot with said guide opening.

2. The air cylinder as claimed in claim 1, wherein said air inlet of said rear cylinder cap is align with said air passage; and a guide opening located at the inner end of said air inlet, said guide opening on said rear cylinder cap being communicable with said cylinder chamber.

3. The air cylinder as claimed in claim 1, wherein said exhaust holes are provided on said rear cylinder cap.

4. The air cylinder as claimed in claim 3, wherein said rear cylinder cap is provided on a circumferential wall with an air releasing slot communicating with said exhaust holes.

5. The air cylinder as claimed in claim 1, wherein said exhaust holes are provided on said front cylinder cap.

6. The air cylinder as claimed in claim 5, wherein said front cylinder cap is provided on a circumferential wall with an air releasing slot communicating with said exhaust holes.

7. The air cylinder as claimed in claim 1, wherein said exhaust holes are provided on both said rear and said front cylinder caps.

8. The air cylinder as claimed in claim 7, wherein said rear and said front cylinder caps are provided on respective circumferential wall with an air releasing slot to separately communicate with said exhaust holes provided on said rear and said front cylinder cap.

9. The air cylinder as claimed in claim 1, wherein said air inlet has an inlet port located on an outer end surface of said rear cylinder cap; an air guiding member is further provided to mount to an outer end surface of said rear cylinder cap; and said air guiding member being internally provided with a passage to communicate with said air inlet.

10. The air cylinder as claimed in claim 9, wherein said rear cylinder cap has a plurality of exhaust holes provided thereon, two ends of each said exhaust hole are respectively located at two end surfaces of the rear cylinder cap; and said air guiding member having a plurality of exhaust holes provided thereon to communicate with the exhaust hole of said rear cylinder cap.

11. An air cylinder, comprising:
a cylinder body having a cylinder chamber therein for mounting a rotor, two open ends of the cylinder chamber being located at two end of said cylinder body; an air passage being formed in said cylinder body with two open ends of said air passage located at two ends of said cylinder body;
a rear cylinder cap being covered onto a rear end of said cylinder body, and having an air inlet provided thereon to communicate with said air passage of said cylinder body, and an inner end of said air inlet also communicating with said cylinder chamber;
a front cylinder cap being covered onto a front end of said cylinder body; a guide opening being formed on an inner end surface of said front cylinder cap, and communicating said air passage of said cylinder body with said cylinder chamber; and
a plurality of exhaust holes being provided on at least one of said cylinder caps to communicate with said cylinder chamber,
wherein said cylinder is configured to flow pressurized air entering said air passage through both said inner end of said air inlet and said guide opening into said cylinder chamber,
wherein said exhaust holes are provided on said rear cylinder cap,
wherein said rear cylinder cap is provided on a circumferential wall with an air releasing slot communicating with said exhaust holes.

12. An air cylinder, comprising:
a cylinder body having a cylinder chamber therein for mounting a rotor, two open ends of the cylinder chamber being located at two end of said cylinder body; an air passage being formed in said cylinder body with two open ends of said air passage located at two ends of said cylinder body;
a rear cylinder cap being covered onto a rear end of said cylinder body, and having an air inlet provided thereon to communicate with said air passage of said cylinder body, and an inner end of said air inlet also communicating with said cylinder chamber;
a front cylinder cap being covered onto a front end of said cylinder body; a guide opening being formed on an inner end surface of said front cylinder cap, and communicating said air passage of said cylinder body with said cylinder chamber; and
a plurality of exhaust holes being provided on at least one of said cylinder caps to communicate with said cylinder chamber,
wherein said cylinder is configured to flow pressurized air entering said air passage through both said inner end of said air inlet and said guide opening into said cylinder chamber,
wherein said exhaust holes are provided on said front cylinder cap,
wherein said front cylinder cap is provided on a circumferential wall with an air releasing slot communicating with said exhaust holes.

* * * * *